__United States Patent__ [19]

Ravault

[11] 4,004,933

[45] Jan. 25, 1977

[54] PRODUCTION OF POROUS CERAMIC MATERIALS
[75] Inventor: Frank Ernest George Ravault, Birmingham, England
[73] Assignee: Foseco International Limited, Birmingham, England
[22] Filed: Dec. 20, 1972
[21] Appl. No.: 317,088
[30] Foreign Application Priority Data
  Jan. 14, 1972  United Kingdom ............... 1929/72
[52] U.S. Cl. ............................... 106/40 R; 264/44; 106/41
[51] Int. Cl.² ........................ C03C 3/22; B29H 7/22
[58] Field of Search ............... 106/41, 40 R, 74, 75; 264/44; 260/37 R
[56] References Cited
  UNITED STATES PATENTS

| | | | |
|---|---|---|---|
| 2,235,881 | 3/1941 | Franke | 264/44 X |
| 3,150,989 | 9/1964 | Parsons | 106/41 X |
| 3,234,308 | 2/1966 | Herrmann | 106/41 X |
| 3,352,635 | 11/1967 | Machin | 106/41 X |
| 3,408,180 | 10/1966 | Winkler | 264/44 X |
| 3,497,455 | 2/1970 | Ahr | 106/41 X |
| 3,510,394 | 5/1970 | Cadotte | 106/41 X |
| 3,533,813 | 10/1973 | Geltman | 264/44 X |
| 3,536,480 | 10/1970 | Winkler | 264/44 X |
| 3,686,006 | 8/1972 | Horton | 264/44 X |

*Primary Examiner*—Winston A. Douglas
*Assistant Examiner*—John F. Niebling
*Attorney, Agent, or Firm*—Cushman, Darby & Cushman

[57] ABSTRACT

Porous ceramic materials are made by impregnating a foam with a slurry of finely divided ceramic material, drying and firing the foam. Prior to impregnating the foam it is treated so that the particulate material of the slurry will adhere to the foam.

14 Claims, No Drawings

PRODUCTION OF POROUS CERAMIC MATERIALS

This invention relates to the production of porous ceramic materials.

Methods of making porous ceramic materials are described in British Patent Specifications Nos. 923862, 916784, 1004352, 1019807, and 1054421. In these methods the general procedure is to take a body of porous organic foam material e.g. polyurethane foam, impregnate the foam with a slurry of finely divided ceramic material, usually in water, and finally dry and fire the so-obtained structure. The organic foam disappears on firing to leave a ceramic structure. In order to ensure coherence, the slurry may contain a binder such as a clay, a phosphate or sodium silicate.

One difficulty which is sometimes encountered when carrying out the manufacture of porous ceramic materials in this way is the tendency of the ceramic slip to drain almost completely from parts of the foam structure due to interfacial phenomena between the slurry and the organic substrate.

The deposit of ceramic slip is as a result thinner than is desirable and its thickness is also extremely variable.

Additionally in reticular foams the slip tends to accumulate at the joint points between rods of polymer rather than along the length of the rods themselves.

After firing there remains either loose powder or weak, low density, virtually discontinuous ceramic structures.

No useful improvement results from the use of wetting agents in the slurry or by increasing slurry viscosity by means of organic thickening agents or increased solids content.

According to the present invention, prior to impregnation of the organic foam with the slurry containing finely divided particulate material, the foam is treated in such a fashion that, on contact with the slurry, the particulate material therein becomes adherent to the surface of the so-treated foam. This may be effected, for example, by generating a. a local (i.e. in the immediate vicinity of the surfaces of the organic foam) flocculation of ceramic particules, or b. a local formation of a gel or gelatinous precipitate of a type which does not then readily redisperse into the slurry carrier, and which occludes suspended ceramic particles. Additionally, the composition of the gelatinous precipitate may be such that upon subsequent drying and firing it forms a ceramic substance.

By these means a satisfactorily thick coating of ceramic particles is formed on the foam.

Method (a) just noted may be effected, for example, by dipping the polymer foam into a solution of a flocculating agent appropriate for the materials contained in the ceramic slip. The solvent chosen for the flocculating agent must not produce swelling of the foam, e.g. for polyurethane foams, water or a low molecular weight alcohol, say methanol or ethanol, or an alcohol - water mix may be chosen. The flocculating agent may be a synthetic high molecular weight polymer, e.g. a polyacrylamide, a copolymer of acrylamide and acrylic acid, a polyethyleneimine or an ethoxylated polyethyleneimine, or a cellulose derivative, e.g. sodium carboxy-methyl cellulose, or a polysaccharide gum or mucilage, e.g. a galacto-mannan polysaccharide.

Usually when the flocculating agent is a polyacrylamide, a copolymer of acrylamide and acrylic acid, a polyethyleneimine or an ethoxylated polyethyeneimine a solution containing 0.005 – 1.0% by weight flocculating agent will be used to treat the foam. When a cellulose derivative or a polysaccharide gum or mucilage is used the concentration will usually be 0.01 – 5.0% by weight.

The foregoing substances possess amineamide, and-/or hydroxyl groups which become attached to sites on the surfaces of alumina, clays aluminosilicates, silica, and other inorganic solids suspended in the ceramic slip. After drying in any convenient manner, the foam is then dipped into the ceramic slip, surplus slip centrifuged off, and the foam body dried, preferably by microwave heating. Coating thickness may be increased by repeating this cycle as many times as necessary. The foam body is then fired.

In the case of method (b) there are many means by which a rapid and marked increase in viscosity may be brought about in the immediate vicinity of the polymer strands. The body of the organic foam may be pre-treated with a base, for example, monoethanolamine, which is to some degree absorbed into the polymer strands, and dried. The base may be used as an aqueous solution, usually containing at least 5% by weight of the base, or when the base is a liquid the organic foam may be pretreated with the base itself. The body is then dipped into a slip containing as one of its components a solution of aluminium hydroxychloride ($Al_2(OH)_5Cl \cdot 2\text{-}3\ H_2O$). The concentration of aluminium hydroxychloride will normally be in the range 5–57% weight/weight of the aqueous phase of the slip. Localized precipitation of aluminium hydroxide gel then occurs, entraining ceramic particles suspended in the slip. The body is then dried, preferably by microwave heating, recoated if necessary until the desired coating thickness results, dried and fired.

In another example, the body of organic foam may be pretreated with a solution of a divalent or tervalent metal salt in water or preferably low molecular weight alcohol, for example, ethanol, or a mixture of such an alcohol and water, (the alcohol ensures even wetting of the organic foam). e.g. a solution of hydrated calcium nitrate in industrial methylated spirits, and dried. The concentration of the solution may vary from about 1% by weight of the divalent or tervalent metal salt to a saturated solution of the salt in the chosen solvent at room temperature. A slip is then prepared by dispersing ceramic powders in silica sol, and the pretreated organic foam dipped into the slip. The metal ions cause a localized precipitation of silicic acid gel, entraining ceramic particles suspended in the slip. The body is then dried, recoated if necessary and dried and fired as before. The concentration of silica in the silica sol in the slip will normally be in the range of 1–50% weight/weight of the aqueous phase.

In another example, the body of organic foam is pretreated with a solution of a divalent or tervalent metal salt as in the previous example, and dried. The body is then dipped into a slip containing as one of its components a dispersion of polyacrylamide (usually 0.05 – 1.0% weight/volume of the aqueous phase), or polyacrylic acid (usually 0.1 – 5.0% weight/volume of the aqueous phase). Localised precipitation of a pituitous gel then occurs, entraining ceramic particles suspended in the slip. The body is then dried, recoated if necessary until the desired coating thickness results, dried and fired as before.

In another example, the body of organic foam is pretreated with a solution of an alkali metal silicate, and dried. The concentration of the solution may vary from about 1 – 50% by weight alkali metal silicate solids, and the upper limit of concentration will be dependent on the silica to alkali metal oxide ratio of the particular alkali metal silicate. For example in the case of sodium silicate the maximum practical concentration for a 3:1 $SiO_2$: $Na_2O$ grade is approximately 39% by weight while for a 2:1 $SiO_2$ : $Na_2O$ grade the upper limit will be approximately 50% by weight. At higher concentrations the solutions tend to be too viscous for effective use. The body is then dipped into a ceramic slip containing as one of its components an aluminium salt. Localized co-precipitation of silica and aluminium hydroxide gels then occurs in the vicinity of the organic foam substrate, entraining ceramic particles suspended in the slip. The body is then dried, recoated if necessary, dried and fired as before. Usually the ceramic slip will contain sufficient aluminium salt to give a concentration of 0.1 – 14.0% weight of $Al^{+++}$ ions based on the volume of the aqueous phase of the slip.

In another example the body of the organic foam is pretreated as before with a solution of polyacrylamide of molecular weight approx 6,000,000. (The solution will usually contain 0.005 – 0.5% by weight polyacrylamide.) It is then dipped into a slip containing as one of its components a dispersion of polyethylene glycol of molecular weight approximatey 20,000. Usually 0.1 – 20.0% by weight of polyethylene glycol will be used based on the volume of the aqueous phase of the slip. Localized formation of an organic gel then takes place which entrains ceramic particles suspended in the slip. The body is then dried, recoated if necessary, dried and fired as before.

In another example, the body of organic foam may be treated with a solution of polycarboxylic acid, and dried. The solution will usually contain 0.01 – 5.0% by weight polycarboxylic acid. It is then dipped into a slip containing a base, for example, ammonia. Normally sufficient ammonia is used to maintain a pH of more than 6 after dipping. A polycarboxylate gel forms in the immediate vicinity of the polymer strands, entrapping ceramic particles suspended in the slip. In this instance it is of course equally feasible to pretreat the polymer body with monoethanolamine as described above, and to incorporate the polycarboxylic acid in a slightly acid slip. This would be preferable with, for example, alumina-containing slips which are more easily dispersed at low pH values.

The following examples will serve to illustrate the invention. Examples 1, 2 and 5 show method (a) above, while Examples 3, 4, 6 and 7 show method (b):

EXAMPLE 1

A shape of polyester polyurethane foam having 4 to 8 pores per linear cm was dipped into a 0.1% by weight solution in 50/50 methanol/water of nonionic polyacrylamide of molecular weight approximately 1,000,000. Surplus solution was centrifuged off, and the treated reticular foam shape dried in a current of hot air.

A slip was made up to the following recipe:

|  | Parts by weight |
|---|---|
| Micronized alumina 0.004 to 0.010mm particle size. | 100 |
| Pigment grade titania | 2 |
| Aluminium hydroxychloride ($Al_2(OH)_5Cl.2-3H_2O$) | 10 |
| Dextrin | 10 |
| Water | 100 | by stirring the ingredients together. To each litre of slip were added 5ml of silicone antifoam emulsion 5ml of a high molecular weight alcohol.

The treated reticular polymer was dipped into this slip, withdrawn, surplus slip centrifuged off, and the resulting body dried by microwave heating, loaded into saggars and heated at a maximum rate of 100° C/hr. to 1550° C, held at that temperature for 21 hours, then cooled to room temperature at a rate not exceeding 100° C/hour. A strong reticular ceramic body resulted.

EXAMPLE 2

A shape of reticular foam as in Example 1 was dipped into a 0.01% by weight solution in 50/50 methanol/water of anionic polyacrylamide of molecular weight between 3,000,000 and 10,000,000. Surplus solution was removed by centrifuging and the foam shape dried as in Example 1.

A slip was prepared by mixing the following components with a high speed stirrer:

|  | Parts by weight |
|---|---|
| Dextrin | 20 |
| Kaolin | 25 |
| Nepheline Syenite all less than 0.075mm | 35 |
| Fused mullite all less than 0.075mm | 70 |
| Water | 100 |

To each liter of slip were added 5ml each of silicone emulsion antifoam and a high molecular weight alcohol. The treated reticular polymer was dipped into this slip, withdrawn, centrifuged and dried by microwave heating. The dried body was then dipped for a second time into the polyacrylamide solution, centrifuged and dried as before, then dipped for a second time into the slip and centrifuged and dried as before. The body was then heated at a rate not exceeding 100° C/hr to 300° C., held at 300 ° C for 4 hours, then heated at a rate not exceeding 100° C/hr to 1250° C, held for 16 hours at 1250° C and cooled to room temperature at a rate not exceeding 100° C/hr preferably 50° C/hr.

A strong reticular body of mullite-porcelain resulted.

EXAMPLE 3

A shape of reticular polyester polyurethane foam having 4–8 pores per linear centimetre was soaked in monoethanolamine for 2 hours. It was then rinsed in running water and dried in a current of warm air.

A ceramic slip was prepared by stirring together the following ingredients with a high speed mixer:

|  | Parts by weight |
|---|---|
| Alumina trihydrate | 50 |
| Dextrin | 10 |
| Pigment grade titania | 1 |
| Aluminium hydroxychloride ($Al_2(OH)_5Cl.2-3H_2O$) | 10 |

| | Parts by weight |
|---|---|
| Water | 50 |

To each liter of slip was added 5ml each of silicone emulsion and a high molecular weight alcohol.

The treated foam was dipped into this slip, withdrawn, centrifuged to remove a surplus slip and dried by microwave heating. The dried body was put through this cycle two further times to build up a satisfactory coating thickness on the polymer strands.

The body was then heated at a maximum rate of 100° C/hr to 1550° C, held at that temperature for 21 hours, then cooled to room temperature at a maximum rate of 100° C/hr.

a strong reticular alumina body resulted.

EXAMPLE 4

A shape of polyester polyurethane foam was dipped into a 0.1% solution of polycarboxylic acid, surplus solution removed by centrifuging, and the foam shape dried in a current of hot air. A slip was prepared to the same recipe as in Example 2, and rendered alkaline by the addition of 20ml of 0.880 s.g. ammonia solution per litre of slip.

The treated reticular body was then dipped into the slip and subsequently proceeded in exactly the same manner as shown in Example 2.

A strong reticular body of mullite-porcelain resulted.

EXAMPLE 5

A shape of reticular foam as in Example 1 was dipped into a 0.5% by weight aqueous solution of a galactomannan polysaccharide of an approximate molar ratio of 2 mannose to 1 galactose containing also 0.05% by weight of, as a non-ionic wetting agent, a nonyl-phenol ethylene oxide adduct containing 4 ethylene oxide groups per molecule. Surplus solution was centrifuged off, and the treated reticular foam shape dried in a current of hot air. A slip was made up to the following recipe:

| | Parts by weight |
|---|---|
| Dextrin | 200 |
| Micronized calcined alumina all under 0.010mm | 2600 |
| Nepheline Syenite all less than 0.075mm | 900 |
| Sodium montmorillonite clay | 100 |
| Sodium hexametaphosphate | 1 |
| Water | 2500 | by stirring the ingredients together with a high speed stirrer. To each liter of slip were added 5 ml of silicone antifoam emulsion and 5 ml of a high molecular weight alcohol.

The treated reticular polymer shape was dipped into this slip, withdrawn, surplus slip centrifuged off, and the resulting body dried by a current of hot air.

The dried body was then treated for a second time with the solution of polysaccharide and wetting agent, again dried, again treated with the ceramic slip, and again dried.

The body was then loaded into a saggar and heated in a gas kiln at a rate not exceeding 100° C/hr. to 300° C, held at 300° C for 4 hours, then heated to 1320° C at a rate not exceeding 100° C/hr. held at 1320° C for 20 hours and cooled to room temperature at a rate not exceeding 100° C/hr., preferably 50° C/hr.

A strong reticular body of high alumina porcelain resulted.

EXAMPLE 6

A shape of reticular polyester polyurethane foam as in Example 1 was dipped into a 0.01% solution in equal volumes of water and methanol of an anionic polyacrylamide of molecular weight 1,000,000, surplus solution allowed to drain, and the shape dried in a current of hot air.

A ceramic slip was made by dissolving 0.4 grams of polyethylene glycol of molecular weight 20,000 plus 220 grams of dextrin in a liter of water, then stirring in the following ingredients:

| | |
|---|---|
| Petalite all less than 0.075mm | 600 grams |
| Kaolin | 300 grams |
| Silicone emulsion antifoam agent | 6 grams |

The treated reticular polymer was dipped into this slip, withdrawn, surplus slip centrifuged off, and the resulting body dried by means of a current of hot air.

Depending on the strand thickness and density required in the final ceramic body, the foregoing processes can be repeated as necessary, i.e. the coated body is again treated with the polyacrylamide solution, dried, then again coated with the slip and dried and so forth.

Finally the body was placed in a saggar and heated to 1300° C in a gas fired kiln at a rate not exceeding 100° C/hr. with a four hour hold at 300° C, maintained at 1300° C for 15 hours, and allowed to cool to room temperature at a rate not exceeding 150° C/hr.

A strong reticular body of a thermal shock resistant lithia-alumina-silica ceramic resulted.

EXAMPLE 7

A solution was prepared by dissolving 10 grams of hydrated magnesium chloride in a mixture of 95 grams of anhydrous ethanol and 5 grams of water. This solution ws employed to treat a shape of reticular polyester polyurethane foam having 4 to 8 pores per linear centimetre according to the technique described in the preceding examples.

A ceramic slip was prepared to the following recipe:

| | Parts by weight |
|---|---|
| Colloidal silica sol containing 30% w/w SiO$_2$ | 100 |
| Dextrin | 10 |
| Talc all less than 0.075 mm | 50 |
| Kaolin | 50 |
| Magnesia alumina spinel all less than 0.075 mm | 10 | by stirring all the ingredients together.

The treated foam was dipped into this slip, withdrawn, centrifuged to remove surplus slip, and dried by microwave heating.

It was then treated for a second time in the alcoholic solution of magnesium chloride, dried, and again treated with the slip, centrifuged and dried.

It ws then placed in a saggar in a gas fired kiln and heated at a rate not exceeding 100° C/hr first to 300° C which temperature was sustained for 3 hours, then to 1380° C at which it was maintained for 18 hours, then allowed to cool to room temperature at a rate not exceeding 150° C/hr, preferably between 50° C/hr and 100° C/hr.

A reticular ceramic body resulted which was rich in cordierite and had excellent resistance to thermal shock.

The ingredients employed in the ceramic slip must be substantially free from soluble magnesium ions or other soluble di-or polyvalent cations, otherwise premature coagulation of the silica sol will occur.

The purpose of the dextrin used in all these examples is to bind the particulate matter to the polyurethane substrate when dry and to produce a carbon skeleton to aid the retention of shape between the burning out of the polyurethane and the formation of a ceramic bond.

I claim as my invention:

1. In the method of making a porous ceramic material which comprises impregnating a preformed organic foam structure with a slurry of finely divided ceramic material, and drying and firing the so impregnated foam, the improvement which comprises, prior to impregnation of the foam with the slurry applying to at least a portion of the foam at least one liquid composition which penetrates the foam, said liquid composition comprising a material selected from the group of agents which, when contacted by a component of the slurry, cause formation of a gel, whereby the material on contact with the slurry causes said finely divided ceramic material to adhere to the surface of the foam so as to form a thick coating on the foam, and drying the foam prior to impregnation.

2. The method of claim 1 wherein the material is an agent which when contacted by the slurry causes the formation of a gel is a base and the component is aluminum hydroxychloride.

3. The method of claim 2 wherein the base is monoethanolamine.

4. The method of claim 1 wherein the material is an agent which when contacted by the slurry causes the formation of a gel and is one containing divalent and metal ions, and the component of the slurry is a collodial oxide hydrosol.

5. The method of claim 4 wherein the material is hydrated calcium nitrate and the component is colloidal silica sol.

6. The method of claim 1 wherein the material is an agent which when contacted by the slurry causes the formation of a gel and is one containing divalent and metal ions and the component of the slurry is selected from the class consisting of polyacrylamides and polyacrylic acids.

7. The method of claim 1 wherein the material is an agent which when contacted by the slurry causes the formation of a gel and is a water-soluble alkali metal silicate and the component of the slurry is an aluminum salt.

8. The method of claim 1 wherein the material is an agent which when contacted by the slurry causes the formation of a gel and is a polyacryliamide and the component of the slurry is a polyethylene glycol.

9. A method as recited in claim 1 wherein the material is a base and the component is aluminum hydroxychloride and.

10. The method of claim 9 wherein the base is monoethanolamine.

11. A method as recited in claim 1 wherein the material is one containing divalent and metal ions and the component of the slurry is a colloidal oxide hydrosol.

12. A method as recited in claim 11 wherein the material is hydrated calcium nitrate and the component is colloidal silica sol.

13. A method as recited in claim 1 wherein the material is one containing divalent and metal ions and the compound of the slurry is selected from the class consisting of polyacrylamides and polyacrylic acids.

14. A method as recited in claim 1 wherein the material is a polyacrylamide and the component of the slurry is a polyethylene glycol.

* * * * *